United States Patent
Wang et al.

(10) Patent No.: US 12,475,687 B2
(45) Date of Patent: Nov. 18, 2025

(54) METHOD AND APPARATUS FOR TRAINING CLASSIFICATION MODEL AND DATA CLASSIFICATION

(71) Applicants: BEIJING BAIDU NETCOM SCIENCE TECHNOLOGY CO., LTD., Beijing (CN); State Key Laboratory of Internet of Things for Smart City (University of Macau), Macau S.A.R. (CN)

(72) Inventors: Kafeng Wang, Beijing (CN); Chengzhong Xu, Macau S.A.R. (CN); Haoyi Xiong, Beijing (CN); Xingjian Li, Beijing (CN); Dejing Dou, Beijing (CN)

(73) Assignees: BEIJING BAIDU NETCOM SCIENCE TECHNOLOGY CO., LTD., Beijing (CN); State Key Laboratory of Internet of Things for Smart City (University of Macau), Macau S.A.R. (CN)

( * ) Notice: Subject to any disclaimer, the term of this patent is extended or adjusted under 35 U.S.C. 154(b) by 694 days.

(21) Appl. No.: 17/819,777

(22) Filed: Aug. 15, 2022

(65) Prior Publication Data
US 2022/0392199 A1 Dec. 8, 2022

(30) Foreign Application Priority Data
Jun. 16, 2021 (CN) .......................... 202110664724.6

(51) Int. Cl.
*G06N 3/098* (2023.01)
*G06N 3/0985* (2023.01)
(Continued)

(52) U.S. Cl.
CPC ......... *G06V 10/774* (2022.01); *G06N 3/0985* (2023.01); *G06V 10/764* (2022.01); *G06V 10/778* (2022.01); *G06V 10/82* (2022.01)

(58) Field of Classification Search
CPC .......................... G06N 3/0985; G06V 10/774
See application file for complete search history.

(56) References Cited

U.S. PATENT DOCUMENTS

2018/0089586 A1  3/2018  Pau et al.

FOREIGN PATENT DOCUMENTS

| CN | 108256476 | 7/2018 |
|---|---|---|
| CN | 110070086 | 7/2019 |

(Continued)

OTHER PUBLICATIONS

Bulan, "Segmentation- and Annotation-Free License Plate Recognition With Deep Localization and Failure Identification", IEEE, vol. 18 (Year: 2017).*

(Continued)

*Primary Examiner* — Van C Mang
(74) *Attorney, Agent, or Firm* — Hodgson Russ LLP

(57) ABSTRACT

A method and an apparatus for training a classification model and data classification includes: obtaining a sample set and a pre-trained classification model, wherein the classification model includes at least two convolutional layers, each convolutional layer is connected to a classification layer through a fully connected layer; inputting the sample set into the classification model, and obtaining a prediction result output by each classification layer, wherein the prediction result includes a prediction probability of a class to which each sample belongs; calculating a probability threshold of each classification layer based on the prediction result output by each classification layer; setting a prediction (Continued)

stopping condition for the classification mode according to the probability threshold of each classification layer.

8 Claims, 6 Drawing Sheets

(51) Int. Cl.
*G06V 10/764* (2022.01)
*G06V 10/774* (2022.01)
*G06V 10/778* (2022.01)
*G06V 10/82* (2022.01)

(56) References Cited

FOREIGN PATENT DOCUMENTS

| | | |
|---|---|---|
| CN | 110443284 | 11/2019 |
| CN | 110879917 | 3/2020 |
| CN | 112270252 | 1/2021 |
| CN | 112633169 | 4/2021 |
| WO | 2019091402 | 5/2019 |
| WO | 2019136946 | 7/2019 |

OTHER PUBLICATIONS

CNIPA, First Office Action for CN Application No. 202110664724. 6, Nov. 25, 2023.

* cited by examiner

METHOD AND APPARATUS FOR TRAINING CLASSIFICATION MODEL AND DATA CLASSIFICATION

CROSS-REFERENCE TO RELATED APPLICATIONS

This application claims priority to Chinese Patent Application No. 202110664724.6, filed on Jun. 16, 2021, the entire disclosure of which is incorporated herein by reference.

TECHNICAL FIELD

The present disclosure relates to a field of artificial intelligence, specifically relates to computer vision and deep learning technology, which can be specifically used in intelligent traffic scenarios, and in particular, relates to a method and an apparatus for training a classification model and a method and an apparatus for data classification.

BACKGROUND

With the continuous development of artificial intelligence technology, deep learning technology is widely used in data analysis and processing, and has become an indispensable data processing method in work and life.

Existing classification models use the same network for processing regardless of whether the data is difficult to identify or not. In this way, the prediction time will be too long, and the maximum correct rate cannot be obtained in a limited time, which limits the application scope of the classification model.

SUMMARY

According to a first aspect of the present disclosure, a method for training a classification model is provided, including: obtaining a sample set and a pre-trained classification model, wherein the pre-trained classification model comprises at least two convolutional layers, each convolutional layer is connected with a classification layer through a full connected layer; inputting the sample set into the pre-trained classification model to obtain a prediction result output by each classification layer, wherein the prediction result comprises a prediction probability of a category to which each sample belongs; calculating a probability threshold of each classification layer based on the prediction result output by each classification layer; setting a prediction stopping condition of the classification model according to the probability threshold of each classification layer.

According to a second aspect of the present disclosure, a method for data classification is provided, including: inputting data to be classified into the classification model trained by the method in the first aspect; taking a first convolutional layer as a current convolutional layer, and performing following classification steps of: predicting the data through the current convolutional layer, a current fully connected layer and a current classification layer to obtain a maximum prediction probability; if the maximum prediction probability is greater than a probability threshold of the current classification layer, stopping prediction, and using a class corresponding to the maximum prediction probability as a class of the data; otherwise, inputting an output result of the current convolutional layer to a next convolutional layer, and using the next convolutional layer as the current convolutional layer to continue the above classification steps.

According to a third aspect of the present disclosure, an electronic device is provided, including: at least one processor; and a memory communicatively coupled to the at least one processor; wherein, the memory is stored with instructions executable by the at least one processor, the instructions being executed by the at least one processor to enable the at least one processor to perform the method in the first aspect or the second aspect.

It should be understood that the content described in this section is not intended to identify key or critical features of embodiments of the present disclosure, nor is it intended to limit the scope of the present disclosure. Other features of the present disclosure will become readily understood from the following description.

BRIEF DESCRIPTION OF THE DRAWINGS

The accompanying drawings are used to better understand the present solution, and do not constitute a limitation to the present disclosure.

DETAILED DESCRIPTION

Exemplary embodiments of the present disclosure are described below with reference to the accompanying drawings, which include various details of embodiments of the present disclosure to facilitate understanding, and should be considered as exemplary only. Accordingly, those of ordinary skill in the art will recognize that various changes and modifications of the embodiments described herein can be made without departing from the scope and spirit of the present disclosure. Also, descriptions of well-known functions and constructions are omitted from the following description for clarity and conciseness.

Figure 1:
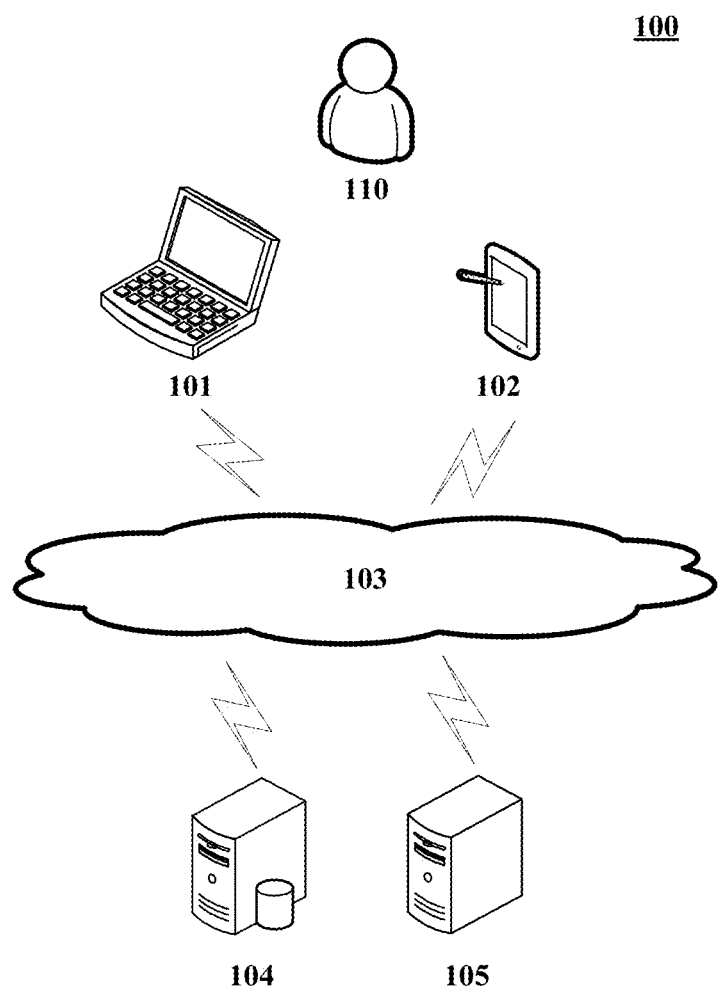
FIG. 1 is a diagram of an exemplary system architecture to which the present disclosure may be applied.

FIG. 1 shows an exemplary system architecture 100 to which a method for training a classification model, an apparatus for training a classification model, a method for data classification, or an apparatus for data classification of embodiments of the present disclosure may be applied.

As shown in FIG. 1, the system architecture 100 may include terminals 101 and 102, a network 103, a database server 104 and a server 105. The network 103 is used as a medium for providing communication links between the terminals 101, 102, the database server 104 and the server 105. The network 103 may include various connection types, such as wired, wireless communication links, or fiber optic cables, and the like.

A user 110 can use the terminals 101 and 102 to interact with the server 105 through the network 103, to receive or send messages and the like. Various client applications may be installed on the terminals 101 and 102, such as model training applications, data identification applications, shopping applications, payment applications, web browsers, instant messaging tools, and the like.

The terminals 101 and 102 here may be hardware or software. When the terminals 101 and 102 are hardware, they may be various electronic devices with display screens, including but not limited to smartphones, tablet computers, e-book readers, and MP3 (Moving Picture Experts Group Audio Layer III) players, laptops and desktops, etc. When the terminals 101 and 102 are software, they may be installed in the electronic devices listed above, and may be implemented as multiple software or software modules (e.g., to provide distributed services), or as a single software or software module. There is no specific limitation here.

When the terminals 101 and 102 are hardware, an image acquisition device may also be installed thereon. The image acquisition device may be various devices that can realize the function of capturing images, such as a camera, a sensor, and the like. The user 110 may use the image acquisition devices on the terminals 101 and 102 to capture images.

The database server 104 may be a database server that provides various services. For example, a sample set may be stored in the database server. The sample set contains a large number of samples. The samples can have class labels, which enables supervised training. In this way, the user 110 can also select samples from the sample set stored in the database server 104 through the terminals 101 and 102.

The server 105 may also be a server that provides various services, such as a background server that provides support for various applications displayed on the terminals 101 and 102. The background server can use the samples in the sample set sent by the terminals 101 and 102 to train the initial model, and can send the training result (e.g., the generated classification model) to the terminals 101 and 102. In this way, the user can apply the generated classification model for data classification.

The database server 104 and the server 105 here may also be hardware or software. When they are hardware, they may be implemented as a distributed server cluster consisting of multiple servers, or as a single server. When they are software, they may be implemented as multiple software or software modules (e.g., to provide distributed services), or as a single software or software module. There is no specific limitation here. The database server 104 and the server 105 may also be servers of a distributed system, or servers combined with blockchain. The database server 104 and the server 105 may also be cloud servers, or intelligent cloud computing servers or intelligent cloud hosts with artificial intelligence technology.

It should be noted that, the method for training a classification model or the method for data classification provided by embodiments of the present disclosure is generally performed by the server 105. Correspondingly, the apparatus for training the classification model or the apparatus for data classification is generally also provided in the server 105.

It should be pointed out that in the case where the server 105 can implement the relevant functions of the database server 104, the database server 104 may not be provided in the system architecture 100.

It should be understood that the number of terminals, networks, database servers and servers in FIG. 1 are merely illustrative. There may be any number of terminals, networks, database servers, and servers according to implementation needs.

Figure 2:
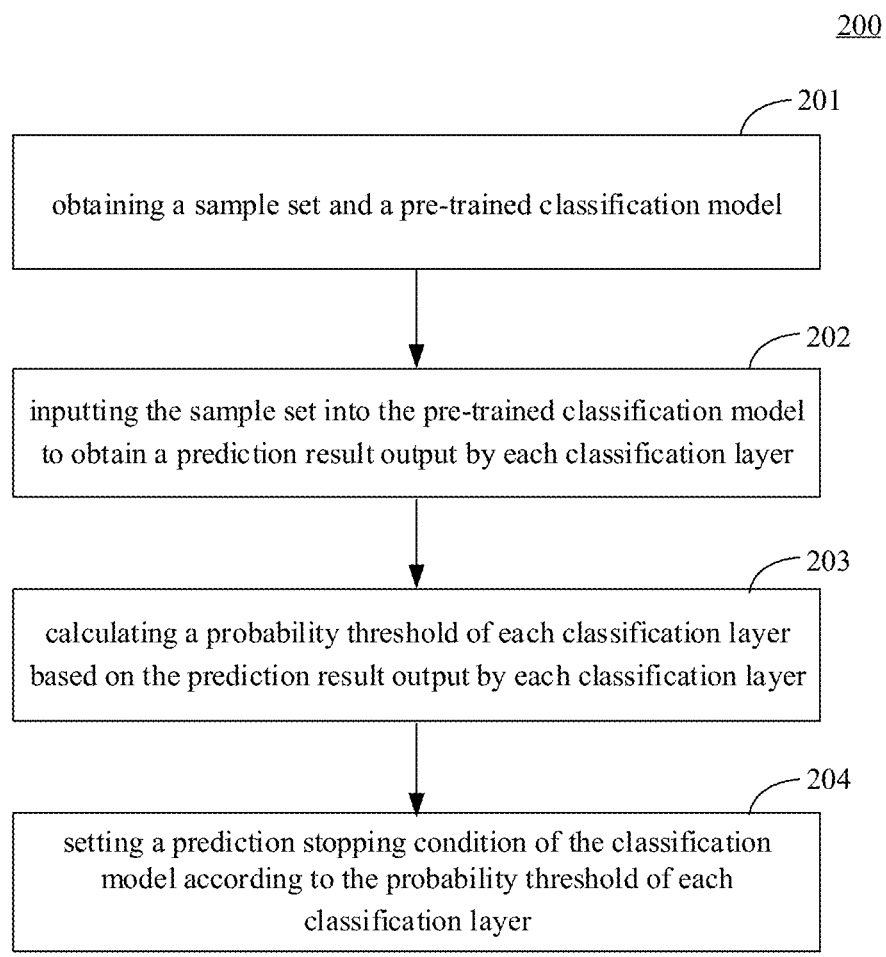
FIG. 2 is a flowchart of an embodiment of a method for training a classification model according to the present disclosure.

Continue to refer to FIG. 2, which shows a flowchart 200 of an embodiment of a method for training a classification model according to the present disclosure. The method for training a classification model may include the following steps:

In step 201, a sample set and a pre-trained classification model are obtained.

In this embodiment, the executive body of the method for training a classification model (for example, the server 105 shown in FIG. 1) may obtain the sample set in various ways. For example, the executive body may obtain the existing sample set stored in the database server (e.g., the database server 104 shown in FIG. 1) through a wired connection or a wireless connection. For another example, the user may collect samples through a terminal (e.g., the terminals 101 and 102 shown in FIG. 1). In this way, the executive body can receive the samples collected by the terminal and store the samples locally, thereby generating the sample set.

Here, the sample set may include at least one sample. The samples in the sample set all belong to the same application field, such as all images or all texts. The samples have class labels, e.g. dog, cat, tree, person, etc.

Figure 3:
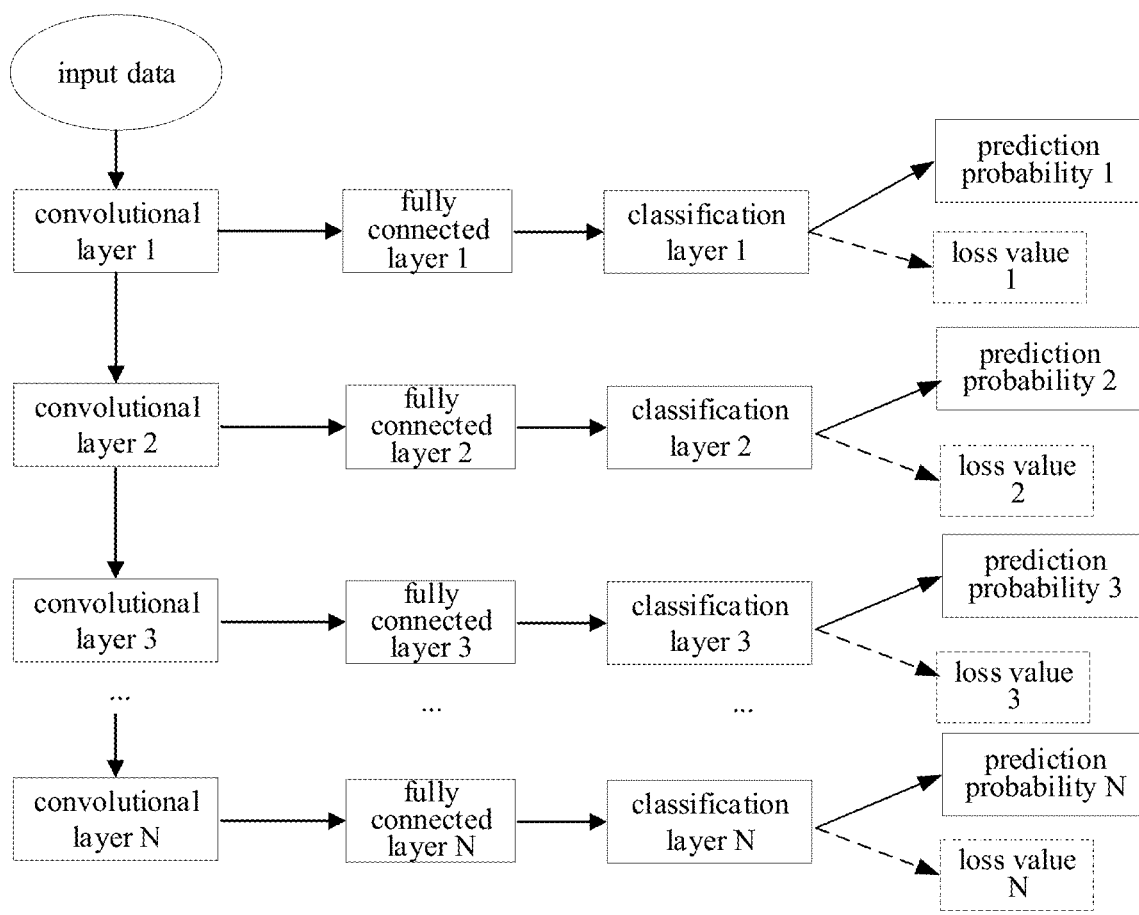
FIG. 3 is a schematic diagram of an application scenario of a method for training a classification model according to the present disclosure.

The classification model employed in this disclosure is a multi-layer neural network. The classification model includes at least two convolutional layers, each convolutional layer is connected to a classification layer through a fully connected layer, and the convolutional layers are connected in series. As shown in FIG. 3, there are a total of N layers of network, each layer includes one convolution layer, one fully connected layer and one classification layer. The classification model is equivalent to N classifiers. The first classifier consists of only one convolutional layer, one fully connected layer and one classification layer, the second classifier consists of two convolutional layers, one fully connected layer and one classification layer, and the $N^{th}$ classifier consists of N Convolutional layers, one fully connected layer and one classification layer. It can be seen that the main difference between different classifiers is the depth of convolution.

The initial model can be trained with other sample sets in advance to obtain the classification model that can classify correctly.

In step 202, the sample set is input into the classification model, and a prediction result output by each classification layer is obtained.

In this embodiment, each classification layer of the classification model can output a prediction result. The prediction result includes a prediction probability of a class to which each sample belongs. For example, if a picture is input into the classification model, the first classification layer outputs a probability that the picture belongs to a cat of 0.6 and a probability of belonging to a dog of 0.4, while the second classification layer outputs a probability that the picture belongs to a cat of 0.7 and a probability of belonging to a dog of 0.3, and the third classification layer outputs a probability that the picture belongs to a cat of 0.8 and a probability of belong to a dog of 0.2. It can be seen that the deeper the layer, the higher the classification accuracy, but correspondingly, the longer the prediction time is.

In step 203, a probability threshold of each classification layer is calculated based on the prediction result output by each classification layer.

In this embodiment, for each classification layer, maximum prediction probabilities of respective samples output by the classification layer (each sample has multiple prediction probabilities, where the maximum prediction probability represents the class to which the sample belongs) are ranked from largest to smallest, and the probability threshold for that classification layer is set from the top ranked maximum prediction probability. The last classification layer may not be set with a probability threshold. The top ranked maximum prediction probability may be a fixed ranking (e.g. $10^{th}$) or a proportional ranking (e.g. top 10%, if there are 200 samples, the top 10% is $20^{th}$). For different classification layers, the requirements for ranking are different. For example, for the first classification layer, the $10^{th}$ maximum prediction probability may be taken as the probability threshold for the first classification layer. For the second classification layer, the $20^{th}$ maximum prediction probability may be taken as the probability threshold for the second classification layer.

In step 204, a prediction stopping condition of the classification model is set according to the probability threshold of each classification layer.

In this embodiment, the prediction can be ended prematurely according to the probability threshold of each classification layer, and the expected prediction result can be obtained without entering the $N^{th}$ classification layer. For example, the probability threshold of the first classification layer is set to 0.8, the probability threshold of the second classification layer is set to 0.85, . . . , and the probability threshold of the $(N-1)^{th}$ classification layer is set to 0.9. The picture is input into the classification model, the maximum prediction probability output by the first classification layer is 0.7, which does not reach 0.8, then the output result of the first convolutional layer needs to be input to the second convolutional layer, and the second classification layer continues to predict, to obtain the maximum prediction probability of 0.9, in which case, the prediction can be ended, and there is no need to input the output of the second convolutional layer into the third convolutional layer, and there is no need for other classification layers to make predictions.

In the method for training a classification model in this embodiment, a reasonable threshold is planned for the data according to a degree of difficulty in classifying the data, which can improve the detection speed and reduce the operation overhead of the model by stopping the classification prediction prematurely while ensuring the correct classification.

In some optional implementations of this embodiment, calculating the probability threshold of each classification layer based on the prediction result output by each classification layer includes: performing following determining steps of selecting a target combination from a predetermined data proportion combination set; determining a planning value of each classification layer corresponding to the target combination according to the prediction result output by each classification layer; and calculating a correct rate corresponding to the target combination based on the prediction result output by each classification layer; repeating the above determining steps until traversal of the data proportion combination set is completed, to obtain the correct rate corresponding to each data proportion combination; using the planning value of each classification layer corresponding to the data proportion combination with the highest correct rate as the probability threshold of each classification layer.

The maximum prediction probabilities are ranked from large to small, and the data proportion combination refers to how many top ranked maximum prediction probabilities are taken by each classification layer as a reference. Take the 3-layer model as an example to illustrate: data proportion combination A {first layer: 10, second layer: 20, third layer: 20}, data proportion combination B {first layer: 5, second layer: 10, third layer: 20}, data proportion combination C {first layer: 10, second layer: 10, third layer: 30}.

Since there are many ways to combine data and the model, the number of data proportion combinations to be explored is $n^k$, where n is the number of samples, and k is the number of layers of the model, that is, the number of classification layers. If $n^k$ is not very large, it can be traversed completely. Otherwise, a search algorithm such as PSO is used to solve this integer programming problem to speed up the search progress. In engineering practice, data can also be divided into different networks according to experience.

Suppose the sample set has n data, and the n data are predicted through the k-layer network model respectively, and k×n×c prediction probabilities log it[k, n, c] are obtained. For each class, take the maximum probability max_preds[k, n] and its corresponding classification argmax_preds[k, n]. The corresponding maximum prediction probability max_preds[k, n] on each layer of the model are ranked from large to small (n values are ranked), and the ranking result of each sample on each layer of the network from easy to difficult to identify is obtained.

The n data of the sample set are allocated to the k-layer model, and each layer is allocated $n_1, n_2, \ldots, n_k$ data, $n=\Sigma_{i=1}^{k}n_i$. According to $n_1, n_2, \ldots, n_k$, the maximum prediction probability corresponding to the ranking position (such as the $10^{th}$ place) in the current classification layer is calculated. This maximum prediction probability is the planning value $h_1, h_2, \ldots, h_k$ of the corresponding classification layer. The n data of the sample set are respectively put on the k-layer model for prediction. When the maximum prediction probability is greater than the corresponding planning value $h_1, h_2, \ldots, h_k$, the output maximum prediction probability is accumulated as the correct rate of the current classification layer, otherwise it is not used as the correct rate of the current classification layer.

The sample set has a total of n image data to be recognized. $A_i^j$ represents the correct rate of recognition of the i-th image data on the j-th layer. The optimization objective of this embodiment is to maximize ACC.

$$ACC=\Sigma_{j=1}^{k}\Sigma_{i=1}^{n_k}A_i^j.$$

Each data proportion combination corresponds to a correct rate, as well as a set of planning values for each classification layer. After traversing all data proportion combinations, a set of planning values for each classification layer corresponding to the data proportion combination with the highest correct rate is used as the probability threshold of each classification layer. In this way, the most suitable probability threshold of the classification layer can be found, and the time cost is minimized while ensuring the accuracy of classification.

In some optional implementations of this embodiment, calculating the correct rate corresponding to the target combination based on the prediction result output by each classification layer includes: determining the maximum prediction probability of each sample in each classification layer based on the prediction result output by each classification layer. For each classification layer, all samples are traversed, and if the maximum prediction probability of the sample in the classification layer is greater than the planning value of the classification layer, the maximum prediction probability of the sample in the classification layer is accumulated as the correct rate. The purpose of this operation is to screen the correct rate and accumulate only the maximum prediction probability greater than the planning value of the classification layer, so as to ensure the accuracy of model identification.

In some optional implementations of this embodiment, the prediction result includes a prediction time of each sample. The method further includes: for each classification layer, calculating a total prediction time of the classification layer based on the prediction time of the samples participating in correct rate accumulation; calculating a total prediction time of the classification model based on the total prediction time of each classification layer; and if the total prediction time of the classification model is greater than a predetermined time threshold, filtering out the correct rate corresponding to the target combination. Thus, the classification accuracy can be guaranteed within a limited time.

This embodiment solves a constrained objective optimization problem. The objective function is ACC, and its constraint condition is that the total prediction time T is less than a given time limit B or its constraint condition is that the total computation FLOPs (floating-point operations) F is less than a given FLOPs limit D. FLOPs is the number of floating point operations that can be used to measure algorithm/model complexity. The correct rate calculated when the total prediction time of the classification model is greater than the predetermined time threshold is filtered out and does not participate in ranking.

Suppose that there is a network with k-layer output, and the training set 2 has a total of n image data to be recognized. $A_i^j$ represents the correct rate of recognition of the i-th image data on the j-th layer of the network, $t_i^j$ represents the prediction consumption time of the i-th image data on the j-th layer of the network, $f_i^j$ represents FLOPs are required for prediction of the i-th image data on the j-th layer of the network. Assuming that n data is allocated to the k-layer model, each layer of the model is allocated $n_1, n_2, \ldots, n_k$ data, $n=\Sigma_{i=1}^{k} n_i$. The overall optimization objective function is as follows:

$$ACC=\Sigma_{j=1}^{k}\Sigma_{i=1}^{n_k}A_i^j$$

argmax(ACC)

s.t. $T=\Sigma_{j=1}^{k}\Sigma_{i=1}^{k}t_i^j<B$ or s.t. $F=\Sigma_{j=1}^{k}\Sigma_{i=1}^{k}f_i^j<D$ Optionally, the correct rate corresponding to the target combination is calculated based on the prediction result output by each classification layer and the weight of the task of each sample. Data for different tasks (such as near images used to detect obstacles, and distant images used to generate maps) are weighted differently when calculating the correct rate. Assuming that the task of each network layer has a weight coefficient $w_j$, $j \in [1, k]$ (for example, the weight of the near image is high), the importance of the task to the overall ACC is formulated as follows. In this way, the classification with the maximum correct rate can be obtained.

$$ACC = \sum_{j=1}^{k} \sum_{k=1}^{n_k} w_j A_i^j$$

argmax(ACC)

s.t. $T = \sum_{j=1}^{k} \sum_{i=1}^{n_k} t_i^j < B$ or s.t. $F = \sum_{j=1}^{k} \sum_{i=1}^{n_k} f_i^j < D$ In some optional implementations of this embodiment, calculating the total prediction time of the classification layer based on the prediction time of the samples participating in the correct rate accumulation includes: calculating an average prediction time of the classification layer based on the prediction time of the samples participating in the correct rate accumulation. The sum of the average prediction time and a predetermined jitter value is calculated as the total prediction time for the classification layer.

Considering the actual situation of the computer system, for the jitter of the calculation time of each layer of the network model, take the calculated average value $\bar{t}_j$, $j \in [1, k]$ of each layer of the network plus a predetermined jitter value, such as 3 times its standard deviation $\sigma_j$, $j \in [1, k]$. This makes the system more stable.

$$ACC=\Sigma_{j=1}^{k}\Sigma_{i=1}^{n_k}w_j A_i^j$$

argmax(ACC)

s.t. $T=\Sigma_{j=1}^{k}(\bar{t}_j+3\sigma_j)<B$

In some optional implementations of this embodiment, the prediction result includes the number of operations of each sample. The method further includes: for each classification layer, calculating the total number of operations of the classification layer based on the number of operations of the samples participating in the correct rate accumulation; calculating the total number of operations for the classification model based on the total number of operations for each classification layer; and if the total number of operations of the classification model is greater than the predetermined number threshold, filtering out the correct rate corresponding to the target combination. The classification performance can be guaranteed under limited computing power.

This embodiment solves a constrained objective optimization problem. The objective function is ACC, and the constraint condition is that the total computation FLOPs (floating point of operations) F is less than the given FLOPs limit D. FLOPs is the number of floating point of operations that can be used to measure algorithm/model complexity. If the total number of operations of the classification model is greater than the predetermined number threshold, the corresponding correct rate does not participate in the ranking. Therefore, the classification with the maximum correct rate can be performed for the batch of data to be classified under limited computation (FLOPs).

In some optional implementations of this embodiment, the classification model is trained by the following steps: acquiring a training data set and a classification model, wherein the training data in the training data set has class labels. The following training steps are performed: selecting training data from the training data set; inputting the selected training data into the classification model, and obtaining the prediction probability output by each classification layer; calculating a total loss value based on the class labels of the selected training data and the prediction probability output by each classification layer. If the total loss value is less than the target value, the classification model training is complete. If the total loss value is not less than the target value, the relevant parameters of the classification model are adjusted to continue to perform the above training steps.

The training data set may be different from the sample set in step 201, or they may be the same. After the training data passes through the classification model, the prediction probability is obtained at each classification layer. As shown in FIG. 3, take recognizing a class of a car as an example to explain in detail.

After inputting the image with the class label as car (the actual probability of belonging to a car is 1) into the classification model, each classification layer obtains the prediction probability that the image belongs to the car, which are presented by prediction probability 1, prediction probability 2 . . . prediction probability N. Then the loss value is calculated according to the prediction probability and the actual probability. For example, if the prediction probability of the first classification layer is 0.6, the loss value of the first classification layer is 0.4. Similarly, the loss values of different classification layers are calculated. The loss values of all classification layers are accumulated as the total loss value. If the total loss value is greater than the target value (for example, 0.05), the network parameters of the classification model are adjusted and the image is reselected to calculate the total loss value. The classification model training is completed until the total loss value is not greater than the target value.

Optionally, the classification model may also be trained layer by layer. For example, first adjust the parameters of the first convolutional layer, the first fully connected layer and the first classification layer, and keep the parameters of other layers unchanged, and then keep the parameters of the first classification layer, the first convolutional layer and the first fully connected layer unchanged, and adjust the parameters of the second layer after the total loss value converges. By analogy, the classification model is finally trained, which can be used to execute processes 200 and 400.

Figure 4:
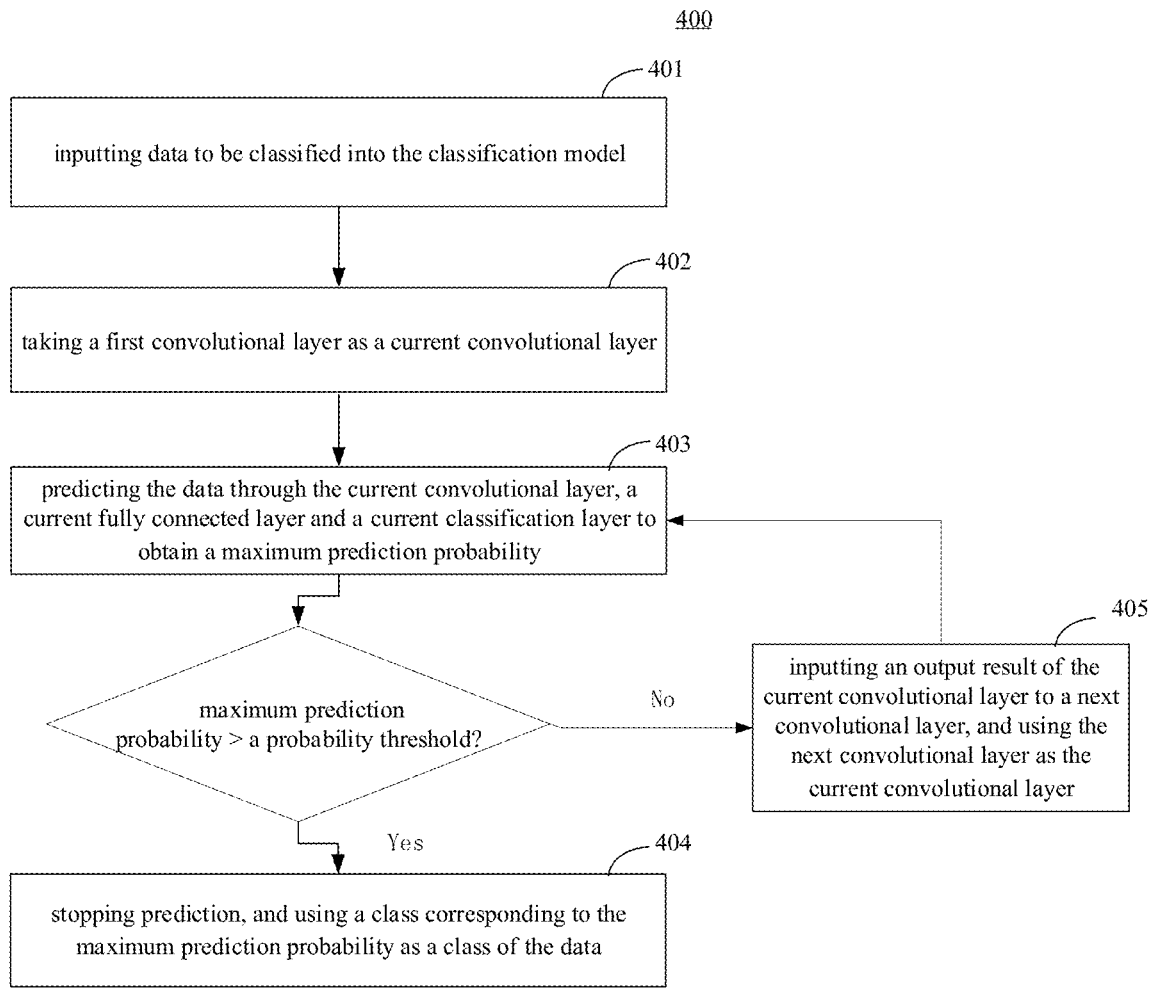
FIG. 4 is a flowchart of an embodiment of a method for data classification according to the present disclosure.

Please refer to FIG. 4, which shows a flowchart 400 of an embodiment of a method for data classification provided by the present disclosure. The method for data classification may include the following steps.

In step 401, data to be classified is input into a classification model.

In this embodiment, the executive body (for example, the server 105 shown in FIG. 1) of the method for data classification can obtain the data to be classified in various ways. For example, the executive body may acquire the data to be classified stored in a database server (e.g., the database server 104 shown in FIG. 1) through a wired connection or a wireless connection. For another example, the executive body may also receive data to be classified collected by a terminal (e.g., the terminals 101 and 102 shown in FIG. 1) or other devices, such as a photographed photo.

The classification model may be generated using the method described in the embodiment of FIG. 2 above. For the specific generation process, reference may be made to the relevant description of the embodiment in FIG. 2, and details are not described herein again.

In step 402, the first convolutional layer is used as the current convolutional layer.

In this embodiment, the data to be classified is first input into the first convolutional layer. The layer that is processing the data is the current layer, and the current layer may include the current convolutional layer, the current fully connected layer, and the current classification layer.

In step 403, the data is predicted through the current convolutional layer, the current fully connected layer and the current classification layer to obtain the maximum prediction probability.

In this embodiment, after the data passes through the current convolutional layer, the current fully connected layer and the current classification layer, a set of prediction probabilities are obtained. The prediction probability represents the probability of the class the data belongs to, for example, the probability of belonging to a dog is 0.8 and the probability of belonging to a cat is 0.2. The largest value in this set of prediction probabilities is the maximum prediction probability, and the corresponding class is the class to which the data belongs.

In step 404, if the maximum prediction probability is greater than the probability threshold of the current classification layer, the prediction is ended, and the class corresponding to the maximum prediction probability is used as the class of the data.

In this embodiment, if the maximum prediction probability is greater than the probability threshold of the current classification layer, it means that the prediction result of the current classification layer is credible, and there is no need to classify through a deeper network, and the class corresponding to the maximum prediction probability output by the current classification layer is used as the class of the data. As in the example above, the class of the data is dog.

In step 405, if the prediction probability is not greater than the probability threshold of the current classification layer, the output result of the current convolutional layer is input to the next convolutional layer, and the next convolutional layer is used as the current convolutional layer, to continue to perform steps 403-405.

In this embodiment, if the maximum prediction probability is not greater than the probability threshold of the current classification layer, it means that the prediction result of the current classification layer is unreliable and needs to be classified through a deeper network. By increasing the number of convolutional layers, more features are extracted to improve the classification accuracy. For example, if the output result of the first convolutional layer is input to the second convolutional layer, the current classification layer is updated to the second classification layer, and the corresponding probability threshold is also updated.

It should be noted that the method for data classification in this embodiment can be used to test the classification model generated by the above-mentioned embodiments. Then, the classification model can be continuously optimized according to the test results. The method may also be a practical application method of the classification model generated by the above embodiments. Using the classification model generated in the above embodiments to classify data is helpful to improve the performance of the classification model, for example, improving the speed and accuracy of classification.

Figure 5:
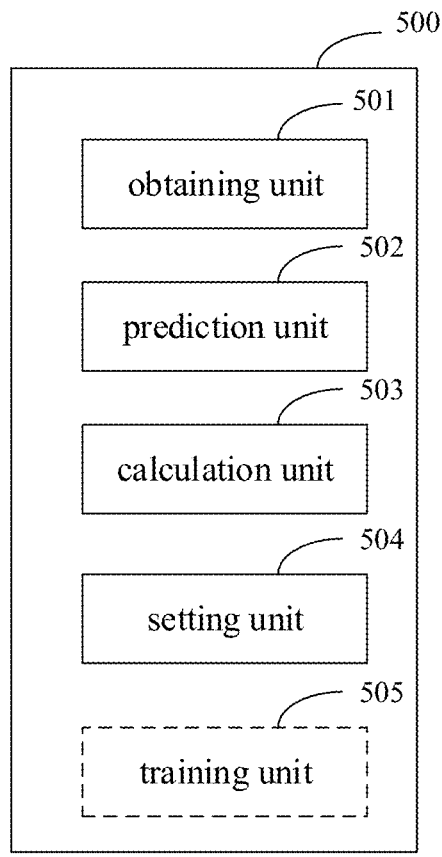
FIG. 5 is a schematic diagram of an embodiment of an apparatus for training a classification model according to the present disclosure.

Continuing to refer to FIG. 5, as an implementation of the methods shown in the above figures, the present disclosure provides an embodiment of an apparatus for training a classification model. This apparatus embodiment corresponds to the method embodiment shown in FIG. 2, and the apparatus can be specifically applied to various electronic devices.

As shown in FIG. 5, the apparatus 500 for training a classification model in this embodiment may include: an obtaining unit 501, a prediction unit 502, a calculation unit 503, and a setting unit 504. The obtaining unit 501 is configured to obtain a sample set and a pre-trained classification model, wherein the classification model includes at least two convolutional layers, and each convolutional layer is connected to a classification layer through a fully connected layer. The prediction unit 502 is configured to input the sample set into the classification model, and obtain a prediction result output by each classification layer, wherein the prediction result includes a prediction probability of a class to which each sample belongs. The calculation unit 503 is configured to calculate a probability threshold of each classification layer based on the prediction result output by each classification layer. The setting unit 504 is configured to set a prediction stopping condition of the classification model according to the probability threshold of each classification layer.

In some optional implementations of this embodiment, the calculation unit 503 is further configured to: perform following determining steps of selecting a target combination from a predetermined data proportion combination set; determining a planning value of each classification layer corresponding to the target combination according to the prediction result output by each classification layer; and calculating a correct rate corresponding to the target combination based on the prediction result output by each classification layer; repeat the determining steps until traversal of the data proportion combination set is completed, and obtaining the correct rate corresponding to each data proportion combination; and use the planning value of each classification layer corresponding to the data proportion combination with the highest correct rate as the probability threshold of each classification layer.

In some optional implementations of this embodiment, the calculation unit 503 is further configured to: determine a maximum prediction probability of each sample in each classification layer based on the prediction result output by each classification layer; for each classification layer, traverse each sample, and if the maximum prediction probability of the sample in the classification layer is greater than the planning value of the classification layer, accumulate the maximum prediction probability of the sample in the classification layer for the correct rate.

In some optional implementations of this embodiment, the prediction result includes the prediction time of each sample. And the calculation unit 503 is further configured to: for each classification layer, calculate a total prediction time of the classification layer based on the prediction time of the samples participating in correct rate accumulation; calculate a total prediction time of the classification model based on the total prediction time of each classification layer; if the total prediction time of the classification model is greater than a predetermined time threshold, filter out the correct rate corresponding to the target combination.

In some optional implementations of this embodiment, the calculation unit 503 is further configured to: calculate an average prediction time of the classification layer based on the prediction time of the samples participating in correct rate accumulation; calculate a sum of the average prediction time and a predetermined jitter value as the total prediction time of the classification layer.

In some optional implementations of this embodiment, the prediction result includes a number of operations for each sample. And the calculation unit 503 is further configured to: for each classification layer, calculate a total number of operations of the classification layer based on the number of operations of the samples participating in correct rate accumulation; calculate a total number of operations of the classification model based on the total number of operations of each classification layer; if the total number of operations of the classification model is greater than a predetermined number threshold, filter out the correct rate corresponding to the target combination.

In some optional implementations of this embodiment, the apparatus 500 further includes a training unit 505, configured to: obtain a training data set and a classification model, wherein training data in the training data set has class labels; perform following training steps of selecting training data from the training data set; inputting selected training data into the classification model to obtain a prediction probability output by each classification layer; and calculating a total loss value based on the class labels of the selected training data and the prediction probability output by each classification layer, wherein if the total loss value is less than a target value, the training of the classification model is completed; if the total loss value is not less than the target value, adjust relevant parameters of the classification model, and continue to perform the training steps.

Figure 6:
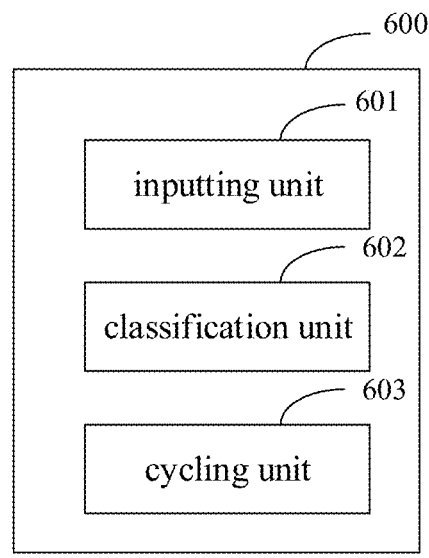
FIG. 6 is a schematic diagram of an embodiment of an apparatus for data classification according to the present disclosure.

Continuing to refer to FIG. 6, as an implementation of the method shown in FIG. 4 above, the present disclosure provides an embodiment of an apparatus for data classification. This apparatus embodiment corresponds to the method embodiment shown in FIG. 4, and the apparatus can be specifically applied to various electronic devices.

As shown in FIG. 6, the apparatus 600 for data classification in this embodiment may include: an inputting unit 601, configured to input data to be classified into the classification model; a classification unit 602, configured to take a first convolutional layer as a current convolutional layer, and perform following classification steps of: predicting the data through the current convolutional layer, a current fully connected layer and a current classification layer to obtain a maximum prediction probability; if the maximum prediction probability is greater than a probability threshold of the current classification layer, stopping prediction, and using a class corresponding to the maximum prediction probability as a class of the data; a cycling unit 603, configured to, otherwise, input an output result of the current convolutional layer to a next convolutional layer, and use the next convolutional layer as the current convolutional layer to continue the above classification steps.

According to an embodiment of the present disclosure, the present disclosure also provides an electronic device, a readable storage medium, and a computer program product.

An electronic device includes: at least one processor; and a memory communicatively connected to the at least one processor; wherein the memory is stored with instructions executable by the at least one processor, the instructions are configured to be executed by the at least one processor to enable the at least one processor to perform the method described in process 200 or 400.

A non-transitory computer-readable storage medium stores computer instructions, wherein the computer instructions are configured to cause the computer to perform the method described in the process 200 or 400.

A computer program product includes a computer program that, when executed by a processor, implements the method described in process 200 or 400.

Figure 7:
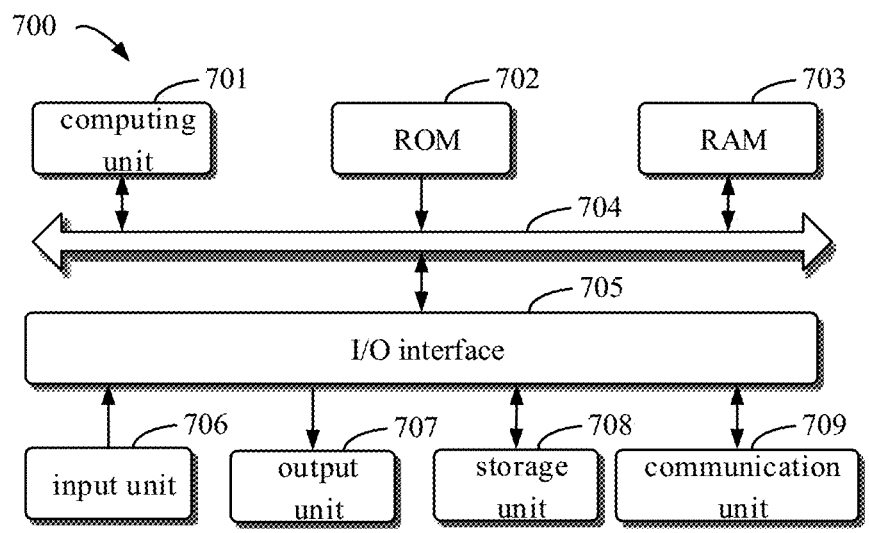
FIG. 7 is a schematic diagram of a computer system suitable for implementing an electronic device of embodiments of the present disclosure.

FIG. 7 shows a schematic block diagram of an example electronic device 700 that may be used to implement embodiments of the present disclosure. The electronic device is intended to represent various forms of digital computers, such as laptops, desktops, workstations, personal digital assistants, servers, blade servers, mainframe computers, and other suitable computers. The electronic device may also represent various forms of mobile devices, such as personal digital processors, cellular phones, smart phones, wearable devices, and other similar computing devices. The components shown herein, their connections and relationships, and their functions are by way of example only, and are not intended to limit implementations of the disclosure described and/or claimed herein.

As shown in FIG. 7, the device 700 includes a computing unit 701 that perform various appropriate actions and processes according to a computer program stored in a read only memory (ROM) 702 or a computer program can be loaded into a random access memory (RAM) 703 from a storage unit 708. In the RAM 703, various programs and data necessary for the operation of the device 700 can also be stored. The computing unit 701, the ROM 702, and the RAM 703 are connected to each other through a bus 704. An input/output (I/O) interface 705 is also connected to the bus 704.

Various components in the device 700 are connected to the I/O interface 705, including: an input unit 706, such as a keyboard, mouse, etc.; an output unit 707, such as various types of displays, speakers, etc.; a storage unit 708, such as a disk, an optical disc, etc.; and a communication unit 709, such as a network card, a modem, a wireless communication transceiver, and the like. The communication unit 709 allows the device 700 to exchange information/data with other devices through a computer network such as the Internet and/or various telecommunication networks.

The computing unit 701 may be various general-purpose and/or special-purpose processing components with processing and computing capabilities. Some examples of the computing unit 701 include, but are not limited to, central processing units (CPUs), graphics processing units (GPUs), various specialized artificial intelligence (AI) computing chips, various computing units that run machine learning model algorithms, digital signal processing processor (DSP), and any suitable processor, controller, microcontroller, etc. The computing unit 701 performs the various methods and processes described above, such as a method for training a classification model. For example, in some embodiments, the method for training a classification model may be implemented as a computer software program tangibly embodied on a machine-readable medium, such as storage unit 708. In some embodiments, part or all of the computer program may be loaded and/or installed on the device 700 via ROM 702 and/or communication unit 709. When the computer program is loaded into RAM 703 and executed by the computing unit 701, one or more steps of the method for training a classification model described above may be performed. Alternatively, in other embodiments, the computing unit 701 may be configured by any other suitable means (e.g., by means of firmware) to perform the method for training a classification model.

Various implementations of the systems and techniques described herein above may be implemented in digital electronic circuitry, integrated circuit systems, field programmable gate arrays (FPGAs), application specific integrated circuits (ASICs), application specific standard products (ASSPs), System-on-a-chip (SOC), load programmable logic device (CPLD), computer hardware, firmware, software, and/or combinations thereof. These various embodiments may include being implemented in one or more computer programs executable and/or interpretable on a programmable system including at least one programmable processor, which may be a special purpose or general-purpose programmable processor, may receive data and instructions from a storage system, at least one input device, and at least one output device, and transmit data and instructions to the storage system, the at least one input device, and the at least one output device.

Program codes for implementing the methods of the present disclosure may be written in any combination of one or more programming languages. These program codes may be provided to a processor or controller of a general-purpose computer, special purpose computer or other programmable data processing apparatus, such that the program code, when executed by the processor or controller, performs the functions/operations specified in the flowcharts and/or block diagrams. The program code may execute entirely on the machine, partly on the machine, partly on the machine and partly on a remote machine as a stand-alone software package or entirely on the remote machine or server.

In the context of the present disclosure, a machine-readable medium may be a tangible medium that may contain or store a program for use by or in connection with an instruction execution system, apparatus, or device. The machine-readable medium may be a machine-readable signal medium or a machine-readable storage medium. Machine-readable media may include, but are not limited to, electronic, magnetic, optical, electromagnetic, infrared, or semiconductor systems, devices, or devices, or any suitable combination of the foregoing. More specific examples of machine-readable storage media would include one or more wire-based electrical connections, portable computer disks, hard disks, random access memory (RAM), read only memory (ROM), erasable programmable read only memory (EPROM or flash memory), fiber optics, compact disk read only memory (CD-ROM), optical storage devices, magnetic storage devices, or any suitable combination of the foregoing.

To provide interaction with a user, the systems and techniques described herein may be implemented on a computer having a display device (e.g., a CRT (cathode ray tube) or an LCD (liquid crystal display) monitor) for displaying information to the user; and a keyboard and pointing device (e.g., a mouse or trackball) through which the user can provide input to the computer. Other kinds of devices can also be used to provide interaction with the user; for example, the feedback provided to the user can be any form of sensory feedback (e.g., visual feedback, auditory feedback, or tactile feedback); and input from the user can be received in any form (including acoustic input, voice input, or tactile input).

The systems and techniques described herein can be implemented on a computing system that includes back-end components (e.g., as a data server), or a computing system that includes middleware components (e.g., an application server), or a computing system that includes front-end components (e.g., a user's computer having a graphical user interface or web browser through which a user may interact with implementations of the systems and techniques described herein), or a computing system including any combination of such back-end components, intermediate components, or front-end components. The components of the system may be interconnected by any form or medium of digital data communication (e.g., a communication network). Examples of the communication network include: Local Area Networks (LANs), Wide Area Networks (WANs), and the Internet.

A computer system may include a client and a server. The client and the server are generally remote from each other and usually interact through a communication network. The relationship of client and server arises by computer programs running on the respective computers and having a client-server relationship to each other. The server can be a distributed system server, or a server combined with a blockchain. The server can also be a cloud server, or an intelligent cloud computing server or intelligent cloud host with artificial intelligence technology. The server can be a distributed system server, or a server combined with a blockchain. The server can also be a cloud server, or an intelligent cloud computing server or intelligent cloud host with artificial intelligence technology.

It should be understood that steps may be reordered, added or deleted using the various forms of flow shown above. For example, the steps described in the present disclosure can be executed in parallel, sequentially, or in different orders. As long as the desired results of the technical solutions disclosed in the present disclosure can be achieved, there is no limitation herein.

The above-mentioned specific embodiments do not constitute a limitation to the protection scope of the present disclosure. It should be understood by those skilled in the art that various modifications, combinations, sub-combinations and substitutions may occur depending on design requirements and other factors. Any modifications, equivalent replacements, and improvements made within the spirit and principles of the present disclosure should be included within the protection scope of the present disclosure.

What is claimed is:

1. A method for data classification, applied in intelligent traffic scenarios, comprising:
obtaining a sample set and a pre-trained classification model, wherein the pre-trained classification model comprises at least two convolutional layers, each convolutional layer is connected with a classification layer through a full connected layer;
inputting the sample set into the pre-trained classification model to obtain a prediction result output by each classification layer, wherein the prediction result comprises a prediction probability of a category to which each sample belongs;
calculating a probability threshold of each classification layer based on the prediction result output by each classification layer;
setting a prediction stopping condition of the classification model according to the probability threshold of each classification layer;
inputting data to be classified into a classification model, wherein the data to be classified is a image acquired by a sensor;
taking a first convolutional layer as a current convolutional layer, and performing following classification steps of: predicting the data through the current convolutional layer, a current fully connected layer and a current classification layer to obtain a maximum prediction probability; if the maximum prediction probability is greater than a probability threshold of the current classification layer, stopping prediction, and using a class corresponding to the maximum prediction probability as a class of the data; and
otherwise, inputting an output result of the current convolutional layer to a next convolutional layer, and using the next convolutional layer as the current convolutional layer to continue the above classification steps;
wherein calculating a probability threshold of each classification layer based on the prediction result output by each classification layer comprises:
performing determining steps of selecting a target combination from a predetermined data proportion combination set; determining a planning value of each classification layer corresponding to the target combination according to the prediction result output by each classification layer; and calculating a correct rate corresponding to the target combination based on the prediction result output by each classification layer;
repeating the determining steps until traversal of the data proportion combination set is completed, and obtaining the correct rate corresponding to each data proportion combination; and
using the planning value of each classification layer corresponding to the data proportion combination with a maximum correct rate as the probability threshold of each classification layer;
wherein, calculating a correct rate corresponding to the target combination based on the prediction result output by each classification layer comprises:
determining a maximum prediction probability of each sample in each classification layer based on the prediction result output by each classification layer; and
for each classification layer, traversing each sample, and if the maximum prediction probability of the sample in the classification layer is greater than the planning value of the classification layer, accumulating the maximum prediction probability of the sample in the classification layer for the correct rate;
wherein the prediction result comprises a prediction time of each sample; and
wherein the method further comprises:
for each classification layer, calculating a total prediction time of the classification layer based on the prediction time of the samples participating in correct rate accumulation;
calculating a total prediction time of the classification model based on the total prediction time of each classification layer; and
if the total prediction time of the classification model is greater than a predetermined time threshold, filtering out the correct rate corresponding to the target combination.

2. The method according to claim 1, wherein, calculating the total prediction time of the classification layer based on the prediction time of the samples participating in correct rate accumulation, comprises:
calculating an average prediction time of the classification layer based on the prediction time of the samples participating in correct rate accumulation; and
calculating a sum of the average prediction time and a predetermined jitter value as the total prediction time of the classification layer.

3. The method according to claim 1, wherein the prediction result comprises a number of operations of each sample; and
the method further comprises:
for each classification layer, calculating a total number of operations of the classification layer based on the number of operations of the samples participating in correct rate accumulation;
calculating a total number of operations of the classification model based on the total number of operations of each classification layer; and
if the total number of operations of the classification model is greater than a predetermined number threshold, filtering out the correct rate corresponding to the target combination.

4. The method according to claim 1, wherein the pre-trained classification model is trained by steps of:
obtaining a training data set and a classification model, wherein training data in the training data set has class labels;
performing following training steps of selecting training data from the training data set; inputting selected training data into the classification model to obtain a prediction probability output by each classification layer; and calculating a total loss value based on the class labels of the selected training data and the prediction probability output by each classification layer, wherein if the total loss value is less than a target value, the training of the classification model is completed; and if the total loss value is not less than the target value, adjusting relevant parameters of the classification model, and continuing to perform the training steps.

5. An electronic device, applied in intelligent traffic scenarios, comprising:

at least one processor; and a memory communicatively coupled to the at least one processor;

wherein, the memory is stored with instructions executable by the at least one processor, and the at least one processor is configured to:

obtain a sample set and a pre-trained classification model, wherein the pre-trained classification model comprises at least two convolutional layers, each convolutional layer is connected with a classification layer through a full connected layer;

input the sample set into the pre-trained classification model to obtain a prediction result output by each classification layer, wherein the prediction result comprises a prediction probability of a category to which each sample belongs;

calculate a probability threshold of each classification layer based on the prediction result output by each classification layer; and set a prediction stopping condition of the classification model according to the probability threshold of each classification layer;

input data to be classified into a classification model, wherein the data to be classified is a image acquired by a sensor;

take a first convolutional layer as a current convolutional layer, and performing following classification steps of: predicting the data through the current convolutional layer, a current fully connected layer and a current classification layer to obtain a maximum prediction probability; if the maximum prediction probability is greater than a probability threshold of the current classification layer, stopping prediction, and using a class corresponding to the maximum prediction probability as a class of the data; and otherwise, input an output result of the current convolutional layer to a next convolutional layer, and using the next convolutional layer as the current convolutional layer to continue the above classification steps;

wherein the at least one processor is further configured to:

perform determining steps of selecting a target combination from a predetermined data proportion combination set; determining a planning value of each classification layer corresponding to the target combination according to the prediction result output by each classification layer; and calculating a correct rate corresponding to the target combination based on the prediction result output by each classification layer;

repeat the determining steps until traversal of the data proportion combination set is completed, and obtaining the correct rate corresponding to each data proportion combination; and use the planning value of each classification layer corresponding to the data proportion combination with a maximum correct rate as the probability threshold of each classification layer;

wherein the at least one processor is further configured to:

determine a maximum prediction probability of each sample in each classification layer based on the prediction result output by each classification layer; and for each classification layer, traverse each sample, and if the maximum prediction probability of the sample in the classification layer is greater than the planning value of the classification layer, accumulate the maximum prediction probability of the sample in the classification layer for the correct rate;

wherein the prediction result comprises a prediction time of each sample;

wherein the at least one processor is further configured to:

for each classification layer, calculate a total prediction time of the classification layer based on the prediction time of the samples participating in correct rate accumulation;

calculate a total prediction time of the classification model based on the total prediction time of each classification layer; and if the total prediction time of the classification model is greater than a predetermined time threshold, filter out the correct rate corresponding to the target combination.

6. The electronic device according to claim 5, wherein, the at least one processor is further configured to:

calculate an average prediction time of the classification layer based on the prediction time of the samples participating in correct rate accumulation; and calculate a sum of the average prediction time and a predetermined jitter value as the total prediction time of the classification layer.

7. The electronic device according to claim 5, wherein the prediction result comprises a number of operations of each sample; and the at least one processor is further configured to:

for each classification layer, calculate a total number of operations of the classification layer based on the number of operations of the samples participating in correct rate accumulation;

calculate a total number of operations of the classification model based on the total number of operations of each classification layer; and if the total number of operations of the classification model is greater than a predetermined number threshold, filter out the correct rate corresponding to the target combination.

8. The electronic device according to claim 5, wherein the pre-trained classification model is trained by steps of:

obtaining a training data set and a classification model, wherein training data in the training data set has class labels;

performing following training steps of selecting training data from the training data set; inputting selected training data into the classification model to obtain a prediction probability output by each classification layer; and calculating a total loss value based on the class labels of the selected training data and the prediction probability output by each classification layer, wherein if the total loss value is less than a target value, the training of the classification model is completed; and if the total loss value is not less than the target value, adjusting relevant parameters of the classification model, and continuing to perform the training steps.

* * * * *